United States Patent [19]

Mauderer

[11] Patent Number: 4,532,794
[45] Date of Patent: Aug. 6, 1985

[54] STAMPING AND BENDING MACHINE FOR MANUFACTURING SHAPED PARTS

[76] Inventor: Ernst Mauderer, Hans-Pfann-Str. 62, 8000 München 82, Fed. Rep. of Germany

[21] Appl. No.: 533,787

[22] Filed: Sep. 19, 1983

[30] Foreign Application Priority Data

Sep. 22, 1982 [DE] Fed. Rep. of Germany ....... 3234981

[51] Int. Cl.³ .......................... B21D 5/00; B21D 28/00
[52] U.S. Cl. ......................................... 72/442; 29/560; 72/455; 72/464; 74/606 R; 74/745; 83/563; 83/574
[58] Field of Search ................. 72/404, 405, 455, 333, 72/464, 429, 442, 381, 384; 29/33 R, 33 S, 33 Q, 560, 56.5, ; 74/606 R, 745; 83/563, 574

[56] References Cited

U.S. PATENT DOCUMENTS 4,412,443 11/1983 Stoehr .................................. 72/249

FOREIGN PATENT DOCUMENTS 2737442 3/1979 Fed. Rep. of Germany .

*Primary Examiner*—E. Michael Combs
*Attorney, Agent, or Firm*—Kuhn Muller and Bazerman

[57] ABSTRACT

A stamping and bending machine, having modular structure, comprises a drive unit, a pull-in feed system, a stamping press and one or several bending appliances are disclosed. Every bending appliance comprises one top and one bottom box of oblong shape forming a closed frame thanks to spacing elements. Within every box, there are two drive shafts which actuate bending attachments provided on the front and rear faces of the top as well as of the bottom boxes. The drive shafts of stamping press and of all bending appliances are coupled frontally. The shafts will all be driven at the same high speed, stepping down being performed not earlier than at a take-off gearing comprised in any bending attachment.

9 Claims, 17 Drawing Figures

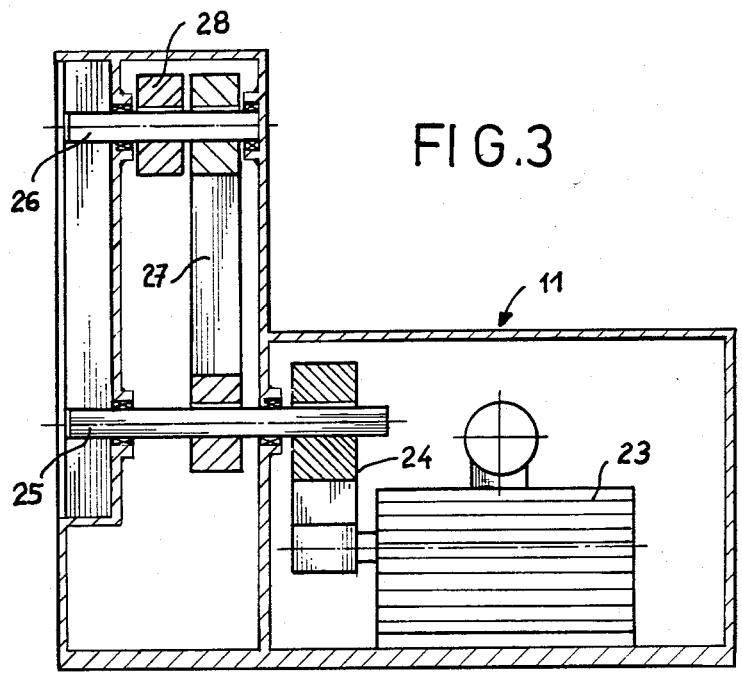
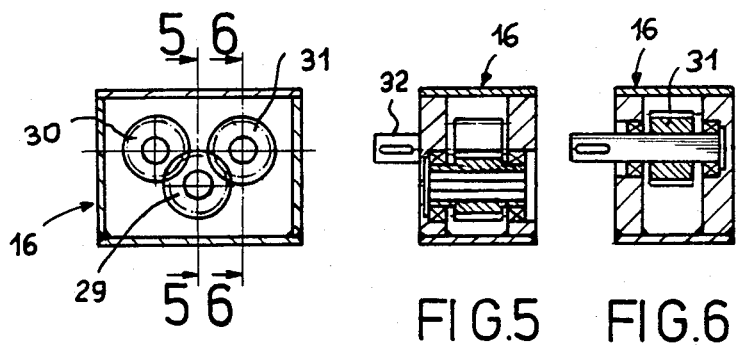

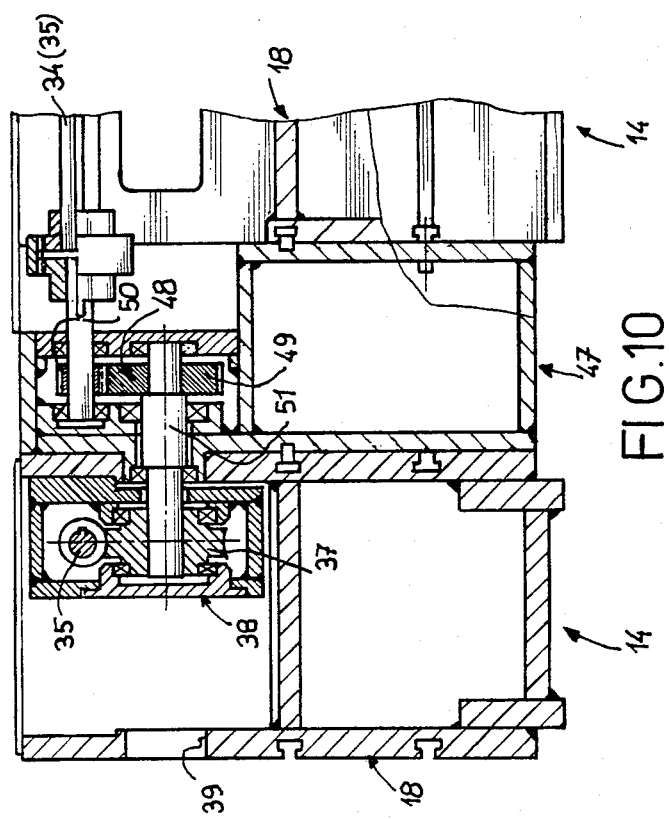
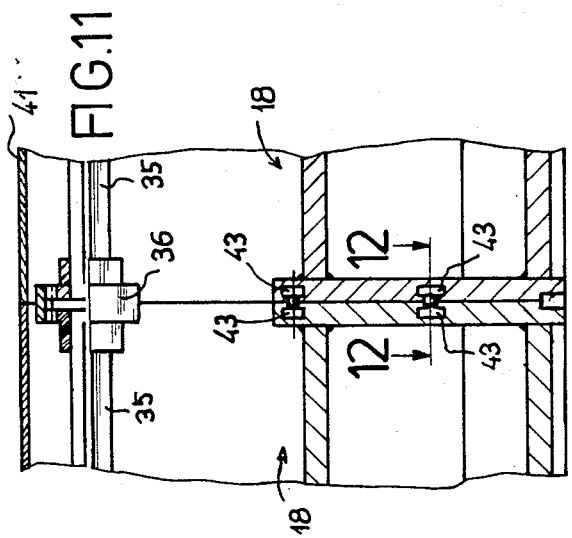
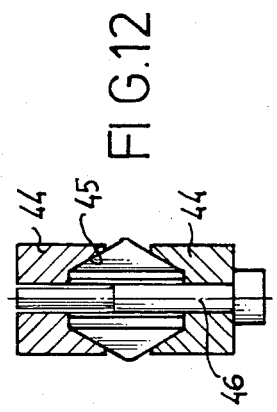

4,532,794

STAMPING AND BENDING MACHINE FOR MANUFACTURING SHAPED PARTS

BACKGROUND OF THE INVENTION

The invention relates to stamping and bending machines and, more particularly, to a stamping and being machine having several interchangeable bending appliances arranged one behind the other. German patent application No. 27 37 442 shows a stamping and bending machine having several interchangeable bending appliances arranged one behind the other, each supporting, adjustably and interchangeably, one or several bending attachments having rotating shafts coupled with a bending appliance gearing to form a driving mechanism, every bending appliance comprising coaxial drive shaft stub ends at opposite sides, one of which ends will be coupled with one of the drive shaft stub ends of the contiguous bending appliance of the stamping press and the central drive unit. The bending appliance comprises a central gear driving a number of bending attachments arranged radially. By way of bevel gearings, the drive shaft stub ends mesh with the central gear. These bevel gearings have to transfer the torques of all bending appliances contacting their output ends. The number of bending appliances put in series is limited. There will be synchronizing errors owing to gearing clearances which are unavoidable and add up.

SUMMARY OF THE INVENTION

In accordance with the invention, in a machine of the type described above, every bending appliance comprises a top shaft and a bottom one parallel to it, both passing through, and that a separate take-off gearing driven directly by one of the shafts is provided for every bending attachment.

It is an advantage of the invention that any number of shaping appliances can be arranged in line or at an angle, through drive shafts being linked directly or by way of curved teeth couplings. Linear arrangement of bending attachments results in increased versatility and output. Another important characteristic of the invention consists in the fact that top and bottom shafts of the last bending or processing appliance in a line of appliances are linked by means of a terminal gearing which drives both shafts so that a synchronizing effect is obtained which will permit even widely differing loads to be applied to the two shafts without there being any disadvantages. This terminal gearing and the central drive unit are located at the two ends of the machine comprising a plurality of processing appliances.

By means of the drawings, one embodiment of the invention is explained in detail.

BRIEF DESCRIPTION OF THE DRAWINGS

FIG. 3 is a diagrammatic view showing a cross section of the drive unit;

FIG. 4 is a power take-off gearing having one input shaft and two output shafts;

FIG. 5 is a section taken along line 5—5 in FIG. 4;

FIG. 6 is a section taken along line 6—6 cutting plane line in FIG. 4;

FIG. 10 is a cross section through the link between two bending appliances arranged at right angles to each other in accordance with FIG. 9, a connection housing being inserted;

FIG. 11 is a cross section through the interface between two bending appliances, showing the connection between housings and the connection between shafts;

FIG. 12 is a horizontal section through a clamping device used to connect the housings;

DETAILED DESCRIPTION

Figure 1:
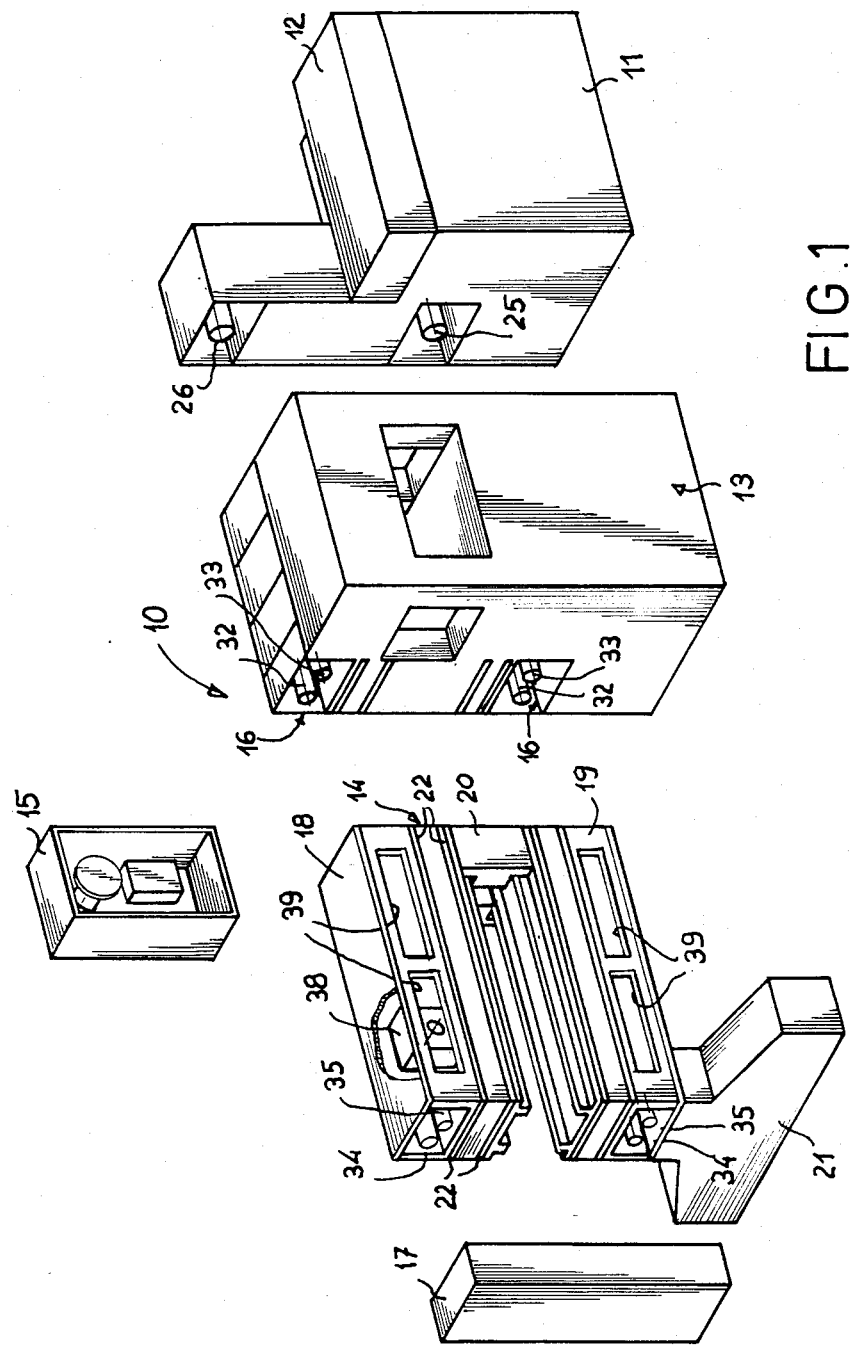
FIG. 1 is a diagrammatic perspective view of a stamping and bending machine, its individual components shown separately.
Figure 2:
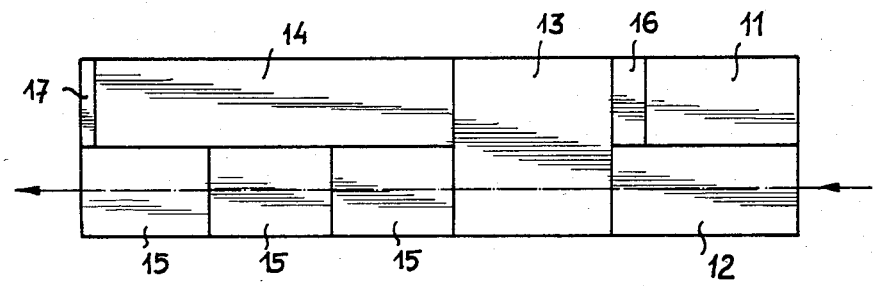
FIG. 2 is a diagrammatic top view of the machine shown on FIG. 1, in its assembled state.

According to FIG. 1, stamping and bending machine (10) comprises a drive unit (11), a material pull-in feed unit (12), a stamping press (13), a bending appliance (14) having a certain number of bending attachments (15), only one of which is shown in FIG. 1, a power take-off gearing (16) associated, in this embodiment, with stamping press (13), and a terminal box (17). Every bending appliance (14) comprises a top box (18) of oblong shape, and an identical bottom box (19) arranged as the mirror image of the top box (18) with reference to the horizontal mid-plane, both being linked into a rigid frame by frontal spacing elements. This frame is mounted on two legs (21) (only one is shown) which may be fitted with castors so as to make bending appliance (14) movable. Every box (18, 19) comprises continuous, sectionally T-shaped grooves (22) used to receive tenon blocks by means of which bending appliance (14) may be detachably connected to stamping press (13), further bending appliances, and terminal box (17). On the front and rear sides of any bending appliance, grooves (22) are used to secure bending attachments (15). Stamping press (13) comprises corresponding grooves (22) at least on its front sides.

Drive motor (23) located within drive unit (11) (FIG. 3) actuates a bottom main shaft via gearing (24). A top main shaft (26) will be driven by shaft (25) at its speed, e.g. by way of toothed belt drive (27). Drive gear (28) on top main shaft (26) is used to drive stamping press (13). The two main shafts (25, 26) both mesh with power take-off gearing (16) comprising main gear (29) and two driven gears meshing with it. The two main shafts (25, 26) mesh with, and drive, main gears (29) and turn driven gears (30, 31), the driven shafts (32, 33) of which are rotated at the same speed.

The two power take-off gearings (16) may alternatively—as in FIG. 1—be built into stamping press

(13) or into drive unit (11), particularly if a certain configuration dispenses with stamping press (13).

Two drive shafts (34, 35) are rotatably supported within either of the two oblong boxes (18, 19) of bending appliance (14). The length of these shafts is approximately equal to that of boxes (18, 19), both of which are open in front. The front ends of both drive shafts (34, 35) are designed to receive curved tooth coupling (36) (FIG. 11) permitting two coaxial shafts to be separated easily. The central sections of shafts (34, 35) are configured into worm screws meshing with, and driving, worm gears (37) (FIG. 7), each of which is rotatably supported in a housing (38) several of which are arranged, one behind the other and side by side, in each of the two boxes (18, 19). Housings (38) are open in front and pierced by shafts (34, 35). The two boxes (18, 19) comprise, on either side, several longitudinal slots (39) the horizontal center lines of which are horizontally aligned with the axes of worm gears (37).

Figure 7:
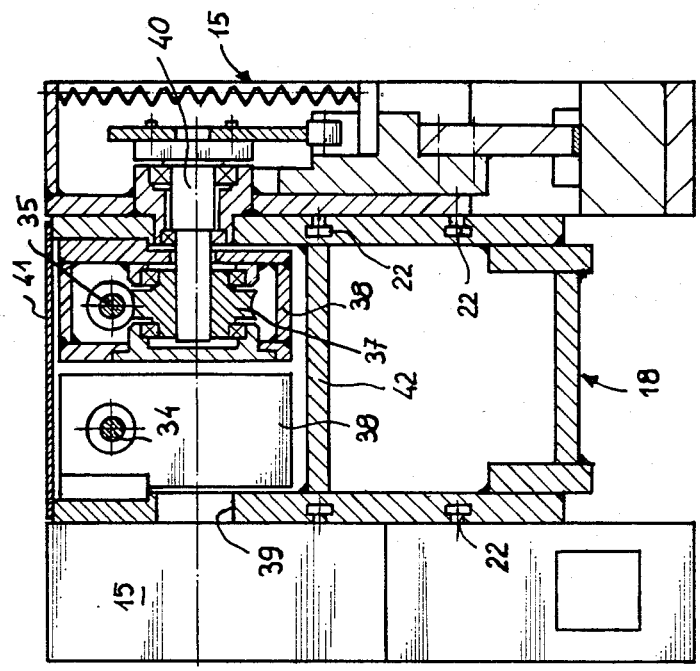
FIG. 7 is a cross section through one bending appliance and bending attachment.
Figure 8:
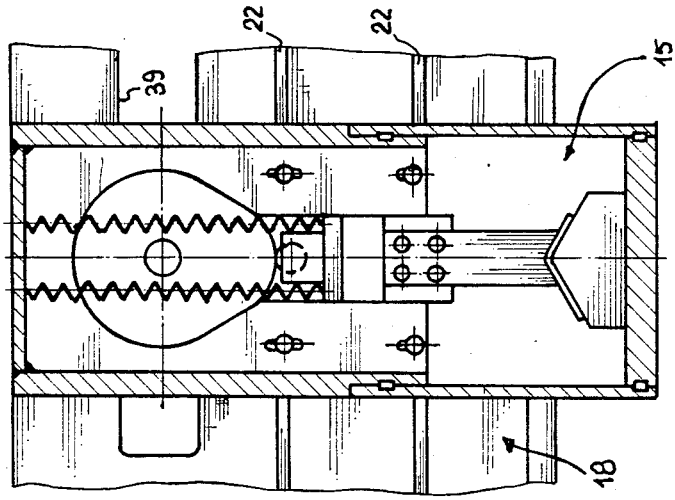
FIG. 8 is a front view of the bending attachment located on the bending appliance.

Bending attachments (15) comprise prior-art drive shafts (40), the rear ends of which are splined to engage positively with the corresponding holes of worm gears (37). At their other ends, drive shafts (40) are fitted with one cam each, any of which cams controls the working travel of a slide carriage fitted with a bending tool. Slide return is achieved by means of a spring. Bending attachment (15) and its shaft (40) protruding through one of slots (39) may be moved longitudinally, together with worm gear housing (38), and clamped into any required position by means of tenon blocks and threaded bolts attached thereto, all movably held within grooves (22), as illustrated in FIGS. 7 and 8. Thereupon, worm gear housings (38) may be fixed, likewise detachably, to boxes (18) and (19). Housings (38) may be built in sufficient numbers, or be inserted as required; in this context, it will be of advantage to support drive shafts (34, 35) within split bearings so as to be in a position to take them out subsequent to removal of cover panel (41). However, it will be just as easy to lower shafts (34, 35) within box (18), i.e. to locate them next to intermediate panel (42) and to configure the housings into U-shapes open towards shafts (34, 35) so that worm gear housings (38) can be inserted from above into top box (18). Two bending appliances (14), one bending appliance and the stamping press, another component, or even terminal box (17) can be joined together by means of tenon blocks (43) which are relocatable within frontal grooves (22) and may be drawn together by means of screws (46) acting upon the tapered surfaces (45) of clamping pieces (44). Thus, the housings will be clamped together detachably as soon as shafts (34, 35) can be driven by means of curved tooth couplings (36). Once these joining elements have been removed, there will be no protruding parts on housing fronts so that every single housing, for instance a bending appliance (14), may be pulled out of the plant towards its front, rear, top or bottom sides without there being any need to change the positions of other housings.

According to the principle set forth above, a plurality of processing appliances may be linked in series. In order to permit high torques to be transmitted by drive unit (11), it is important with this type of plant to link the unsupported stub ends of the four shafts (34, 34, 35, 35) by a coupling mechanism located within terminal box (17). This coupling mechanism consists of two power take-off gearings corresponding to power take-off gearing (16); however, the two main shafts of the two power take-off gearings are positively synchronized, e.g. by a toothed belt; if different loads act upon the various drive shafts, this arrangement will permit forces to be distributed more equally. The four shafts drive at the same speed, which speed will be stepped down only at the individual working attachments. Thus, high torques can be transmitted and high working forces generated.

Figure 9:
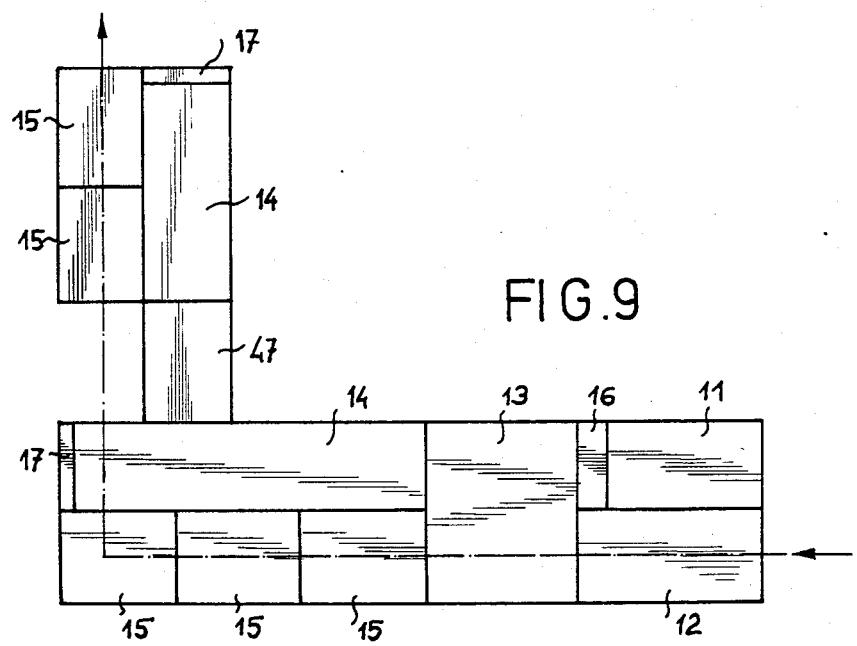
FIG. 9 is a top view of a machine having two bending appliances arranged at right angles to each other.

FIGS. 9 and 10 illustrate how two bending appliances (14) can be connected at an angle by inserting a connection housing (47) linking, by means of tenon blocks placed in the manner described above, the two bending appliances (14) at an angle. Within connection housing (47), there is a cylindrical gear power take-off unit the main gear (49) of which is in mesh with two auxiliary gears (50), their gear ratio being identical to the one applicable to worm gear (37) and worm gear shaft (33) within worm gear housing (38). Just as the drive shaft of any bending attachment (15), connection shaft (51) of main gear (48) will fit into the grooved hole of worm gear (37). Thus, the two shafts (32, 33) of box (18) linked up at an angle by way of connection housing (47) are synchronized with the shafts of the box driving the other bending appliance (14). As may be seen in FIG. 9, every leg of this angled arrangement of bending appliances is terminated in a box (17) comprising a built-in synchronizer gearing, thus creating a closed-loop train of gears in every instance.

Figure 14:
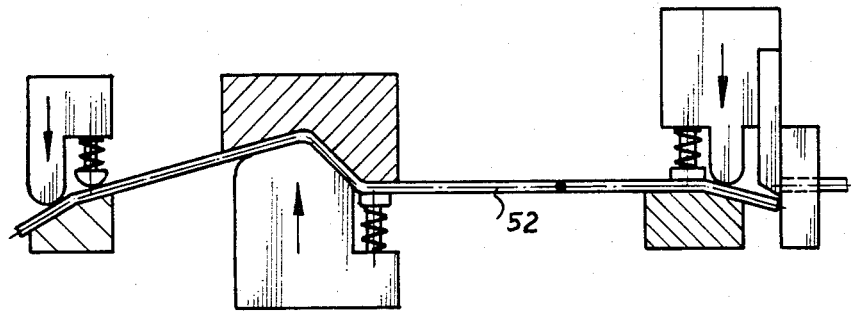
FIG. 14 is a view of the finished control lever.
Figure 13:
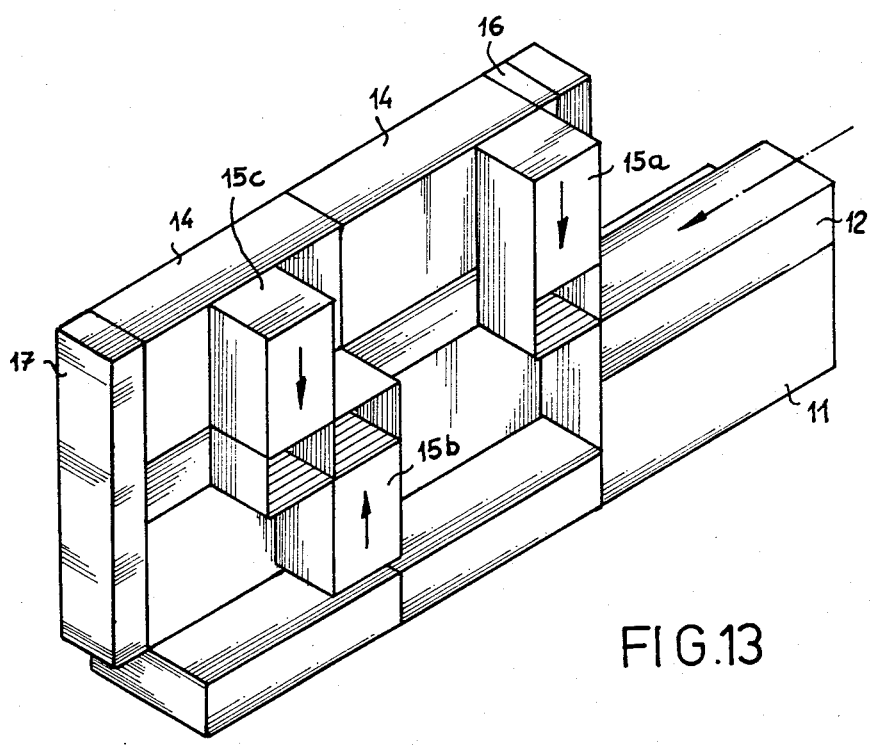
FIG. 13 is a diagrammatic perspective view of a machine comprising two bending appliances used to manufacture a control lever by means of three bending attachments.

If, for instance, a control lever (52) according to FIG. 14 is to be manufactured, a transfer line as illustrated in FIG. 13 will be needed; it is characterized by the absence of a stamping press (13). Two bending appliances (14) are placed in line. On one front end, there is drive unit (11), pull-in feed system (12) and power take-off gearing (16). The opposite end is closed by means of terminal box (17). Three bending attachments (15a, 15b and 15c) will be needed. The top-force bending die of attachment (15a) will clamp blank (52) down on a pressure pad, cut it off from feed stock, and effect the right-hand bend (FIG. 14); at the same time, the bending die of attachment (15b) will move upwards, clamp the blank into position and effect the central bend shown in FIG. 14. Subsequently, the bending die of attachment (15c) will move downwards and effect the left-hand bend.

Figure 15:
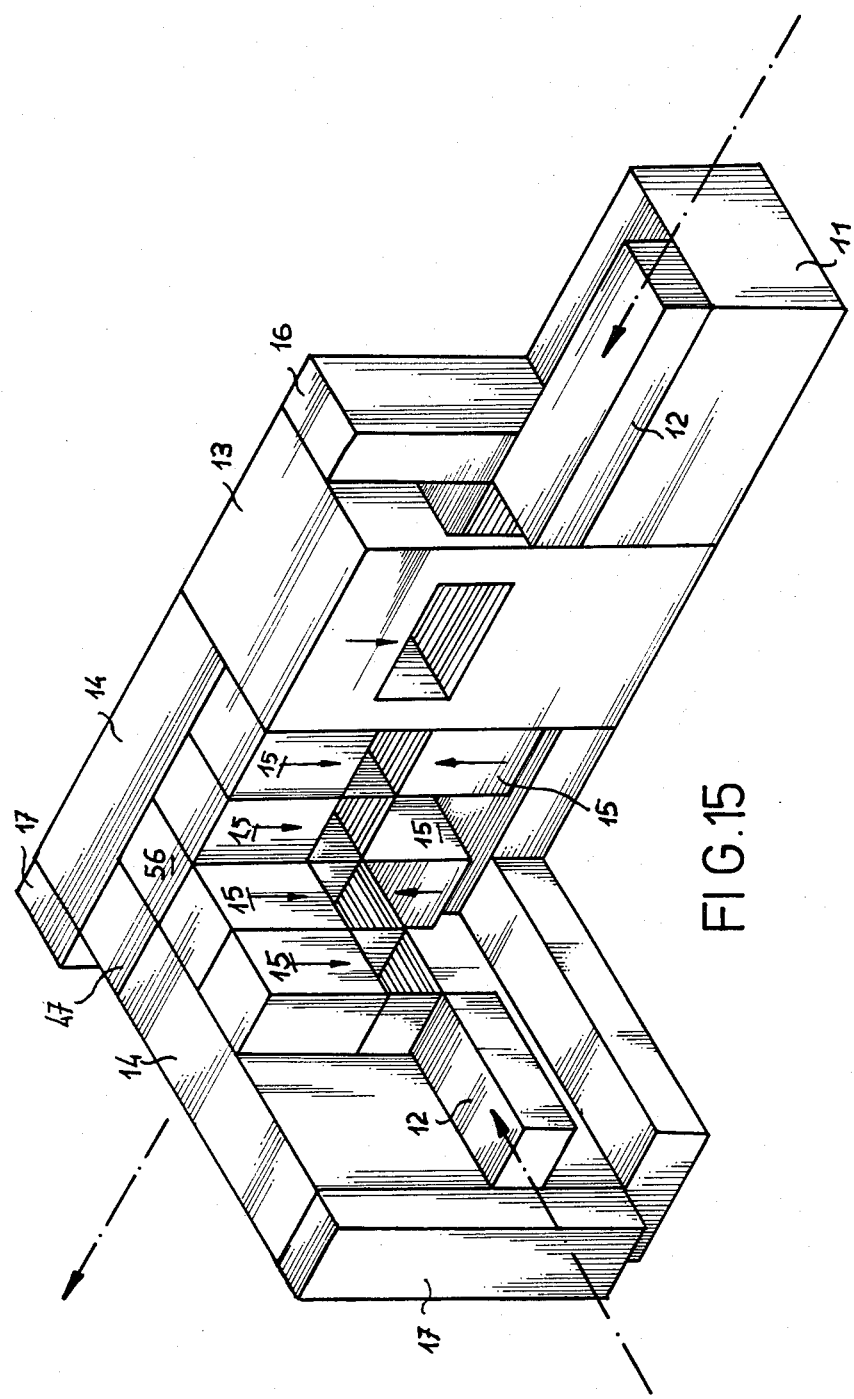
FIG. 15 is a diagrammatic view of a two-module bending machine having an assembly station, for manufacturing a windscreen wiper arm.
Figure 16:
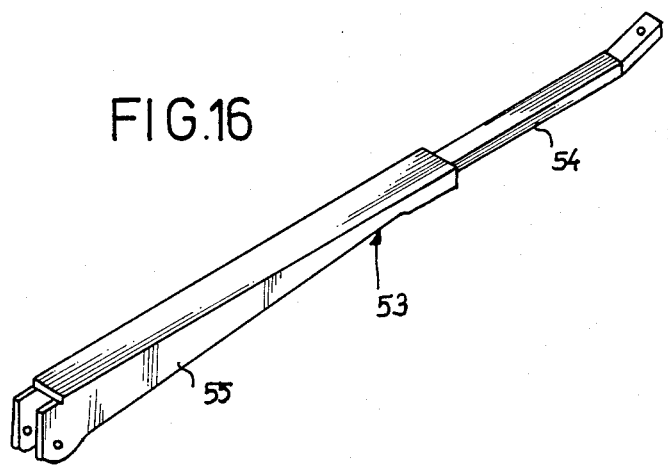
FIG. 16 is a perspective view of the windscreen wiper arm manufactured with the machine shown in FIG. 15.
Figure 17:
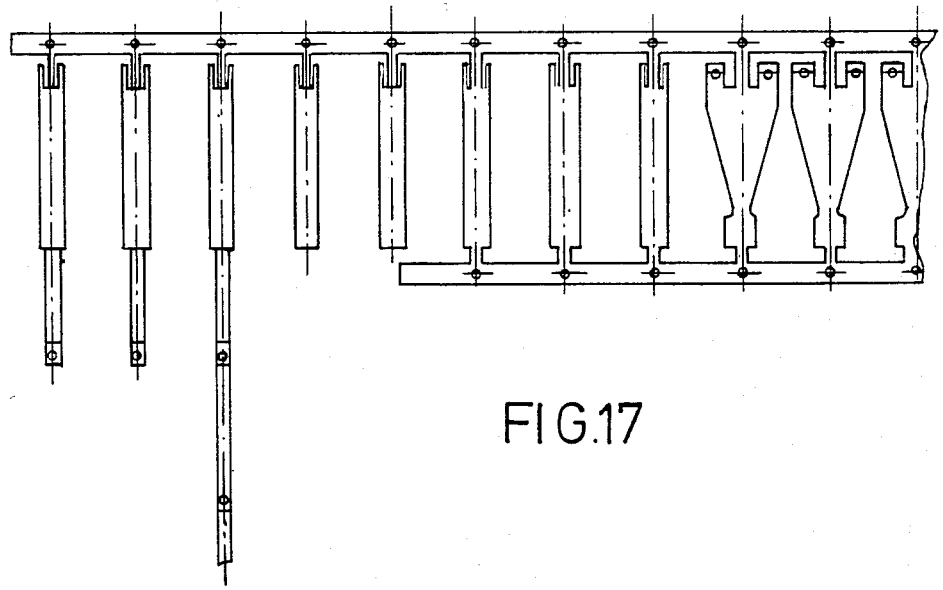
FIG. 17 is a view illustrating the production sequences needed to manufacture the windscreen wiper arm shown in FIG. 16.

FIG. 15 shows the machine subsequent to its having been modified so as to produce another work piece, namely the two-part windscreen wiper arm illustrated in FIG. 16. In accordance with FIG. 10, two bending appliances (14) are connected at an angle by way of connection housing (47). Two pull-in feed attachments (12) are provided; the pull-in feed device (12) shown on the left of FIG. 15 is driven by the front drive shaft of bottom box (19) of bending appliance (14). Windscreen wiper arm (53) consists of front arm (54) and rear arm (55). In accordance with FIG. 15, the material to be processed into front arm (54) will be fed in from the left-hand side, the material to be processed into rear arm (55), from the right-hand side. As is to be seen from the manufacturing flow diagram shown in FIG. 18, stamping press (13) will cut blanks from the strip of material fed in on the right-hand side. The first two bending attachments (15) located above each other will bend the rear arm U-shape. The next attachment (15) cuts off rear arm (55) at one edge, and stamps it. Simultaneously, the first attachment (15) will cut the blank of front arm (54) out of the strip of material pulled in on the left-hand side; the next attachment will bend the blank. Now, assembly attachment (56) will join the two arms (54, 55) and eject them.

The new machine permits relatively large-size work pieces to be processed, since working space is practically unlimited. The modular structure makes for easy retrofitting, its advantages becoming especially clear with the embodiment manufacturing windscreen wiper arms. There are windscreen wiper arms the rear arms (55) of which are identical while their front arms are different, and there are versions having identical front arms (54) while their rear arms are different. In both instances, only one of the bending appliances (14) will have to be replaced.

I claim:

1. An improved stamping and bending machine of the type having several interchangeable bending appliances arranged one behind the other, each supporting, adjustably and interchangeably, at least one bending attachment having a rotating shaft coupled with a bending appliance gearing to define a driving mechanism, every bending appliance having coaxial drive shaft stub ends at opposite sides, one of which ends will be coupled with the drive shaft stub end of the contiguous bending appliance, of one of the stamping press and a central drive unit, the improvement wherein each bending appliance comprises a top and a bottom shaft parallel to each other, and each bending attachment including a take-off gearing operatively connected to and driven directly by one of the top and bottom shaft.

2. An improved stamping and bending machine, as recited in claim 1, further comprising a gear box fixed to a side opposite to the drive unit of one of the last driven bending appliances and a processing appliance, said gear box including and rotatably supporting top and bottom shafts coaxially aligned, and detachably connected, with the top and bottom shafts of any contiguous bending appliance and coupling drive means connecting all shafts to form a driving mechanism having the same drive ratio as those located within the drive unit.

3. An improved stamping and bending machine, as recited claims 1 or 2, further comprising a driven gear including a housing in which the driven gear is rotatably supported and drivable by one of the shafts of said bending appliance, said driven gear having a rotating axis arranged to run at a right angle to a front panel of said bending appliance, the front panel having at least one top slot and one bottom slot running parallel to said bending appliance drive shafts and which are pierced by the geometric axis of driven gear, stub shafts of bending attachments inserted into the slots and wherein the gear housing is arranged movably and in parallel to the longitudinal direction of at least one of the slots and fixed detachably to said bending appliance.

4. An improved stamping and bending machine as recited in claim 3, having bending attachments fastened to front face and rear face, wherein the drive unit, stamping press and bending appliances each comprise a pair of top drive shafts and a pair of bottom drive shafts, the drive shafts of every pair of shafts being spaced next to each other on a horizontal level, at least one gear housing associated with every shaft of at least one pair of shafts, and all of the housings of one bending appliance being arranged contiguously and on both sides of a longitudinally vertical mid-plane thereof.

5. An improved stamping and bending machine, as recited in claim 3, wherein the opposing front faces of every bending appliance comprise grooves on the same levels, movable tenon blocks received in the grooves, and the tenon blocks of one bending appliance and the tenon blocks of one of a contiguous bending appliance and another processing appliance being connected detachably with each other by means of clamping appliances.

6. An improved stamping and bending machine, as recited in claim 5, wherein every bending appliance comprises at least one all-around top groove and one all-around bottom groove having a T-shaped cross section.

7. An improved stamping and bending machine, as recited in claim 6, wherein bending attachments are arranged vertically next to each other and staggered longitudinally above each other at intervals.

8. An improved stamping and bending machine, as recited in claim 7, having two bending appliances arranged at right angles to each other and linked to form a driving mechanism, further comprising a connection housing inserted between the two bending appliances said connection housing detachably connecting the two bending appliances and rotatably supporting at least one of a top and bottom power take-off shaft meshing with take-off gear of one gear housing of one bending appliance to form a drive mechanism and which supports, at its upper end, gear meshing with two gears arranged next to each other at the same level, said gears being attached to shafts coupled detachably with drive shafts of the other bending appliance.

9. An improved stamping and bending machine, as recited in claim 8, wherein every bending appliance comprises one top and one bottom box of oblong shape, both boxes being configured identically and arranged as mirror images around a horizontal mid-plane, every box, further comprising spacing elements and both boxes being connected into a closed frame by means of the spacing elements arranged non-protrudingly between them.

* * * * *